United States Patent
Hueber et al.

(10) Patent No.: US 10,516,445 B2
(45) Date of Patent: Dec. 24, 2019

(54) RF FRONT END MODULE AND NEAR FIELD COMMUNICATION DEVICE

(71) Applicant: NXP B.V., Eindhoven (NL)

(72) Inventors: Gernot Hueber, Linz (AT); Jingfeng Ding, Gratwein (AT); Ian Thomas Macnamara, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/950,835

(22) Filed: Apr. 11, 2018

(65) Prior Publication Data
US 2019/0319672 A1    Oct. 17, 2019

(51) Int. Cl.
| | |
|---|---|
| H04B 5/00 | (2006.01) |
| H04B 7/00 | (2006.01) |
| H04W 4/80 | (2018.01) |
| H01Q 1/22 | (2006.01) |

(52) U.S. Cl.
CPC ......... H04B 5/0031 (2013.01); H01Q 1/2291 (2013.01); H04W 4/80 (2018.02)

(58) Field of Classification Search
CPC ...... H04B 1/04; H04B 1/0062; H04B 1/0075; H04B 1/0081; H04B 1/0475; H04B 1/28; H04B 1/40; H04B 5/0025; H04B 7/0602; H04W 4/80
USPC .............................. 455/41.1, 41.2, 78, 82, 83
See application file for complete search history.

(56) References Cited

U.S. PATENT DOCUMENTS

| | | | |
|---|---|---|---|
| 8,422,946 B2* | 4/2013 | Bangs | H04B 5/00 455/41.1 |
| 8,818,297 B2 | 8/2014 | Merlin | |
| 9,390,360 B1 | 7/2016 | Yang et al. | |
| 9,401,739 B2 | 7/2016 | Pieber et al. | |
| 9,408,015 B2* | 8/2016 | Khorram | H04B 1/16 |
| 9,621,230 B2* | 4/2017 | Ouyang | H04B 5/0081 |
| 9,930,725 B2* | 3/2018 | Mow | H04B 17/102 |

(Continued)

FOREIGN PATENT DOCUMENTS

| | | |
|---|---|---|
| CN | 105446127 A | 3/2016 |
| EP | 2 339 501 A1 | 6/2011 |

(Continued)

OTHER PUBLICATIONS

Notice of Allowance for related U.S. Appl. No. 15/621,286 (dated Jul. 5, 2018).

(Continued)

*Primary Examiner* — Quochien B Vuong

(57) ABSTRACT

A device for inductively coupled communications includes an NFC module for generating an electromagnetic carrier signal and modulating the carrier signal according to data to be transmitted, and a single ended antenna coupled to and driven by said NFC module with the modulated carrier signal. The device includes an RF front end coupled between said NFC module and said antenna. The RF front end includes an inductor coupled to a first terminal of a differential transmitter of said NFC module in the first transmitting path, and a capacitor coupled to a second terminal of said differential transmitter in the second transmitting path. The RF front end further includes a receiving path coupled to an input terminal of a single ended receiver of said NFC module. The RF front end does not use a balanced to unbalanced (Balun) transformer.

10 Claims, 3 Drawing Sheets

(56) References Cited

U.S. PATENT DOCUMENTS

| | | | |
|---|---|---|---|
| 10,200,091 B2* | 2/2019 | Ding | H04B 5/0075 |
| 10,277,058 B2* | 4/2019 | Wheeland | H02J 50/80 |
| 2005/0206471 A1 | 9/2005 | Khorram et al. | |
| 2008/0246411 A1 | 10/2008 | Yang et al. | |
| 2009/0195324 A1 | 8/2009 | Li et al. | |
| 2013/0009704 A1 | 1/2013 | Liao | |
| 2015/0249485 A1 | 9/2015 | Ouyang et al. | |
| 2016/0028446 A1 | 1/2016 | Moon et al. | |
| 2016/0315667 A1 | 10/2016 | Jensen et al. | |
| 2017/0019783 A1 | 1/2017 | Van Bosch et al. | |
| 2017/0288795 A1 | 10/2017 | Ding et al. | |

FOREIGN PATENT DOCUMENTS

| | | |
|---|---|---|
| EP | 3 376 680 A1 | 9/2018 |
| GB | 2 243 038 A | 10/1991 |
| KR | 20120103297 A | 9/2012 |
| WO | 2009/116001 A1 | 9/2009 |

OTHER PUBLICATIONS

U.S. Appl. No. 15/621,286, filed (Jun. 13, 2017).
Extended European Search Report for Patent Appln. No. 18175217.1 (dated Nov. 8, 2018).

* cited by examiner

RF FRONT END MODULE AND NEAR FIELD COMMUNICATION DEVICE

The present disclosure generally relates to an inductively coupled communication system, and more specifically, to a near field communication (NFC) device and an RF front end of said NFC device.

FIG. 1 depicts an example inductively coupled communication system. Communication system 100 may include a first communication device 101 and a second communication device 102. Communication device 101 and communication device 102 communicate with each other using inductively coupled communication. For example, the inductively coupled communication may be NFC. Examples of communication devices include wireless communication devices, cellular phones, smartphones, tablet devices, voice recorders, digital cameras, still cameras, camcorders, gaming systems, laptop computers, etc.

In inductively coupled communication, the first device 101 may generate an electromagnetic field to which the second device 102 may be coupled. For example, in the case of NFC, the direction for the data flow may be characterized by having the first device 101 (also referred to as a polling device, proximity coupling device (PCD), reader or initiator) provide the electromagnetic field. The second device 102 (also referred to as a listener, listening device, proximity integrated circuit card (PICC), tag or target) may communicate with the first device 101 by generating modulation content.

As depicted in FIG. 1, device 102 may include a transmitter 103 and a receiver 104. The transmitter and receiver may be part of an NFC module 106, such as type no. PN5xx manufactured by NXP Semiconductors. Device 102 may further include an RF front end module 105 and an antenna 107. Device 101 may include an antenna 108, which is inductively coupled to the antenna 107.

FIG. 2 is an example NFC communication device. The NFC communication device 200 includes an NFC module 202, such as type no. PN5xx manufactured by NXP Semiconductors. NFC module 202 may include a differential transmitter 203 being adapted to generate an electromagnetic carrier signal, to modulate the carrier signal according to data to be transmitted and to drive an antenna circuit 207 with the modulated carrier signal. NFC module 202 may further include a single-ended receiver 204 being adapted to sense response signals being received at antenna circuit 207 and to demodulate the response signals. NFC module 202 has differential output terminals TX1 and TX2 coupled to respective first and second transmitting paths wherein the first and second transmitting paths are coupled to antenna circuit 207.

The NFC communication device 200 further includes an RF front end module 205 coupled between NFC module 202 and antenna circuit 207. The RF front end module 205 may include an electromagnetic compatibility (EMC) filter 206 comprising two inductors $L_{EMC}$ and two capacitors $C_{EMC}$ (a dedicated LC coupled to each output terminals TX1 and TX2), a balanced to unbalanced (Balun) transformer 208 for converting differential antenna matching network to single-end antenna matching network, a pair of capacitors $C_{SER}$ and $C_{PAR}$ in the transmitting paths, a decoupling capacitor $C_{RX}$ and a resistor $R_{RX}$ in the receiving path.

Inductively coupled communication systems such as NFC present a number of design challenges. One such design challenge is that the analog RF front end of NFC communication devices must be capable of accommodating multiple modes of operation (reader/writer, peer-to-peer, and card emulation). Challenges associated with RF front end design may include, but are not limited to the following: interference from transmitter to receiver, impedance matching from transmitter to antenna and antenna to receiver, BOM of components in the front-end (cost per device related to PCB area, manufacturing, testing, etc.), component variation used in the front-end, significant losses in the EMC inductors, crosstalk between the EMC inductors, unwanted coupling from EMC to other components, to name just a few. As a result of these design challenges associated with producing communication devices of minimal size, weight, complexity, power consumption, and cost there exists a need for an improved RF front end topology in an NFC communication device.

SUMMARY

A device for inductively coupled communications includes an NFC module for generating an electromagnetic carrier signal and modulating the carrier signal according to data to be transmitted, and a single ended antenna coupled to and driven by said NFC module with the modulated carrier signal. The device further includes an RF front end coupled between said NFC module and said antenna. The RF front end includes an inductor coupled to a first terminal of a differential transmitter of said NFC module in the first transmitting path, and a capacitor coupled to a second terminal of said differential transmitter in the second transmitting path. The RF front end further includes a receiving path coupled to an input terminal of a single ended receiver of said NFC module. The RF front end does not use a balanced to unbalanced (Balun) transformer.

In one example embodiment, said device further comprises a capacitor connected in parallel between the antenna and ground.

In one example embodiment, said device further comprises a capacitor connected in series with the inductor, said capacitor being coupled to said first terminal of said differential transmitter in the first transmitting path.

In one example embodiment, said device further comprises a capacitor connected in series between the transmitting paths and the antenna.

In one example embodiment, said receiving path includes a resistor.

In one example embodiment, said receiving path includes a resistor and a decoupling capacitor connected in series.

In one example embodiment, said device is incorporated in a mobile device and adapted to be powered by the mobile device.

A device for inductively coupled communications includes an NFC module for generating an electromagnetic carrier signal and modulating the carrier signal according to data to be transmitted, and a single ended antenna coupled to and driven by said NFC module with the modulated carrier signal. The device further includes an RF front end coupled between said NFC module and said antenna. The RF front end includes an inductor coupled to a first terminal of a differential transmitter of said NFC module in the first transmitting path, and a capacitor coupled to a second terminal of said differential transmitter in the second transmitting path. The RF front end further includes a capacitor connected in parallel between the antenna and ground, and a receiving path coupled to an input terminal of a single ended receiver of said NFC module. The RF front end does not use a balanced to unbalanced (Balun) transformer.

A device for inductively coupled communications includes an NFC module for generating an electromagnetic carrier signal and modulating the carrier signal according to data to be transmitted, and a single ended antenna coupled to and driven by said NFC module with the modulated carrier signal. The device further includes an RF front end coupled between said NFC module and said antenna. The RF front end includes an inductor coupled to a first terminal of a differential transmitter of said NFC module in the first transmitting path, and a capacitor coupled to a second terminal of said differential transmitter in the second transmitting path. The RF front end further includes a capacitor connected in series between the transmitting paths and the antenna, and a receiving path coupled to an input terminal of a single ended receiver of said NFC module. The RF front end does not use a balanced to unbalanced (Balun) transformer.

The above discussion is not intended to represent every example embodiment or every implementation within the scope of the current or future Claim sets.

Various example embodiments may be more completely understood in consideration of the following Detailed Description in connection with the accompanying Drawings.

Figure 1:
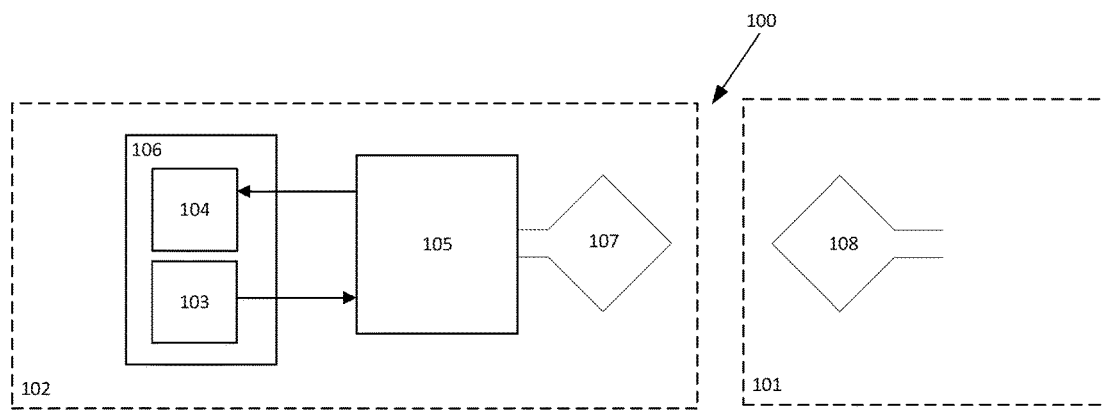
FIG. 1 is an inductively coupled communication system.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Figure 3:
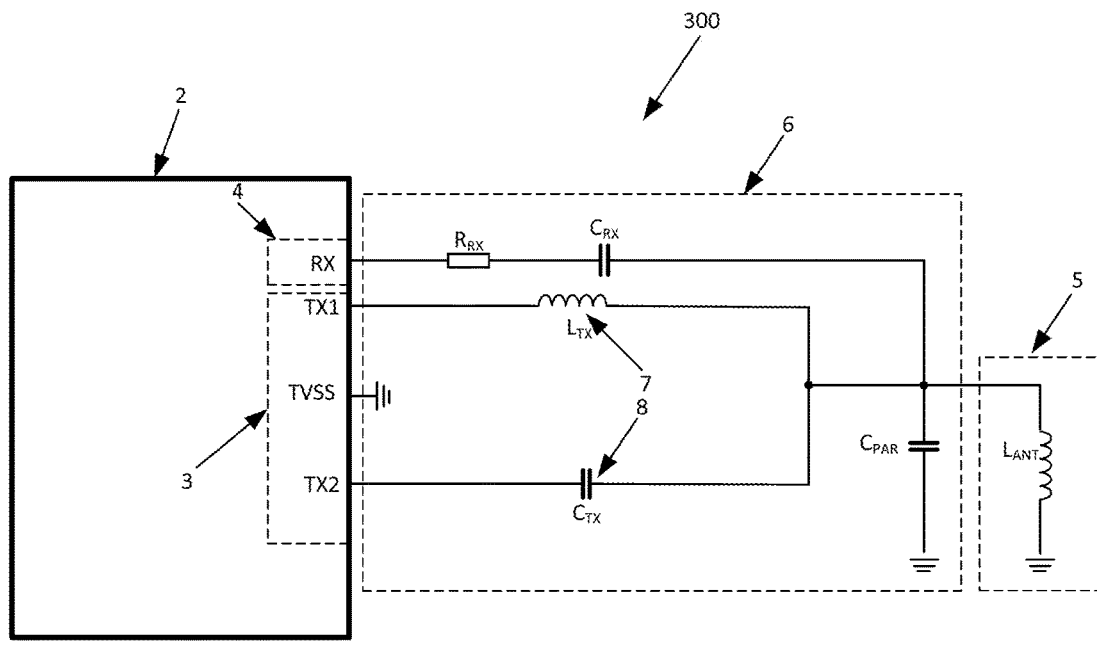
FIG. 3 is an embodiment of an NFC device.

FIG. 3 is one embodiment of an NFC device. As depicted in FIG. 3, the NFC device 300 includes an NFC module 2. The NFC module 2 includes a differential transmitter 3 and a single ended receiver 4. Differential transmitter 3 generates an electromagnetic carrier signal. The carrier signal is modulated according to data to be transmitted. An antenna circuit 5 is driven with the modulated carrier signal. It should be noted that antenna circuit 5 is a single-end antenna. NFC module 2 has differential output terminals TX1 and TX2 being coupled to first and second transmitting paths respectively, wherein the transmitting paths are coupled to the antenna 5.

The NFC device 300 further includes an RF front end module 6 being coupled between the NFC module 2 and antenna circuit 5. The RF front end module 6 may include an inductor $L_{TX}$ 7 coupled to output terminal TX1 in the first transmitting path, and a capacitor $C_{TX}$ 8 coupled to output terminal TX2 in the second transmitting path. This arrangement creates a 180-degree phase shift in the signals from the output terminals TX1 and TX2. The RF front end module 6 may also include a parallel capacitor CPA in the transmitting paths, and a decoupling capacitor $C_{RX}$ and a resistor $R_{RX}$ in the receiving path.

Figure 2:
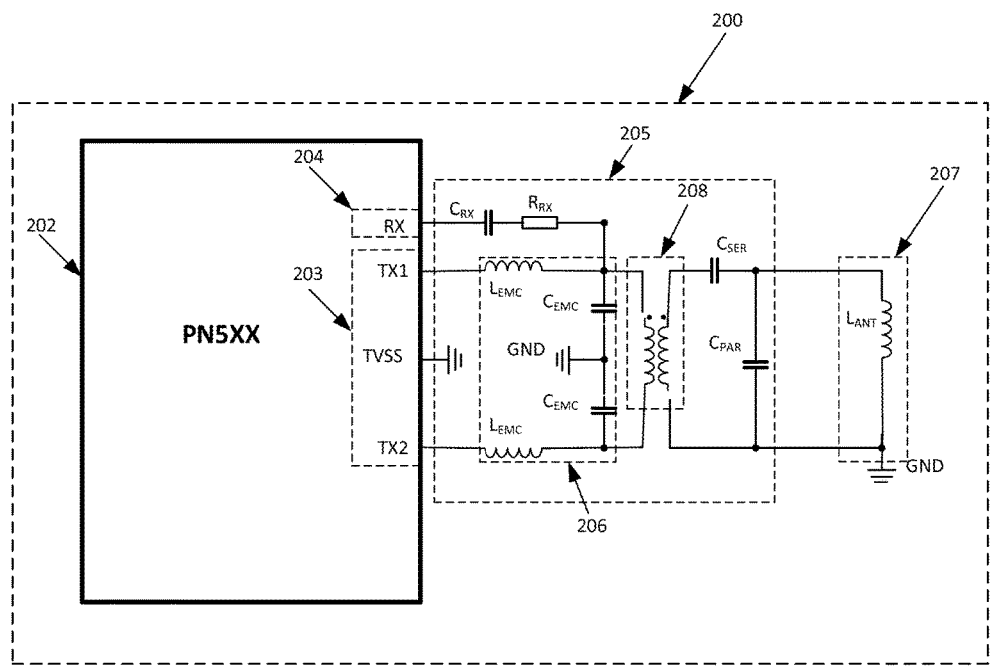
FIG. 2 is an NFC device.

This embodiment allows the use of a differential transmitter (differential transmitter 3) without a Balun transformer and further reduces the number of components used in the RF front end module. For example, instead of using a dedicated EMC filter (a dedicated LC coupled to each of the output terminals TX1 and TX2 as depicted in FIG. 2), the EMC filtering function can be realized by the network comprised of the inductor $L_{TX}$ 7, the capacitor $C_{TX}$ 8, and the parallel capacitor $C_{PAR}$. In addition, the traditionally used series capacitor $C_{SER}$ (as shown in FIG. 2) is eliminated to reduce the number of components used in the RF front end. The series capacitor $C_{SER}$ may be integrated into the network of $L_{TX}$, $C_{TX}$, $C_{PAR}$, $L_{ANT}$ depending on the proper optimization of various device values.

Further advantages of this embodiment may include an increase in output power and power efficiency.

Figure 4:
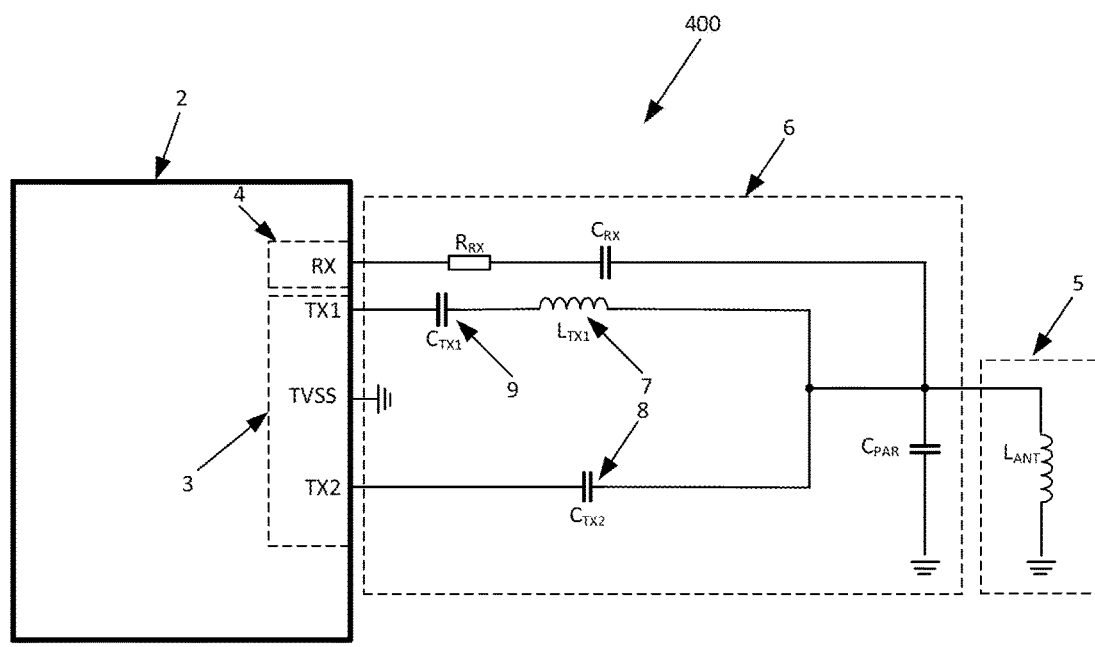
FIG. 4 is another embodiment of the NFC device.

FIG. 4 is another embodiment of the NFC device. This embodiment and the embodiment of FIG. 3 have much in common. The only difference lies in the placement of a capacitor in the first transmitting path as explained below.

As depicted in FIG. 4, the NFC device 400 includes an RF front end module 6 being coupled between the NFC module 2 and antenna circuit 5. The RF front end module 6 may include a capacitor $C_{TX1}$ 9 and an inductor $L_{TX1}$ 7 connected in series and coupled to output terminal TX1 in the first transmitting path. The RF front end module 6 further includes a capacitor $C_{TX2}$ 8 coupled to output terminal TX2 in the second transmitting path. In this embodiment, the capacitor $C_{TX1}$ 9 is added to ensure there is essentially no DC path.

As with the first embodiment, this embodiment allows the use of a differential transmitter (differential transmitter 3) without a Balun transformer and further reduces the number of components used in the RF front end module.

Figure 5:
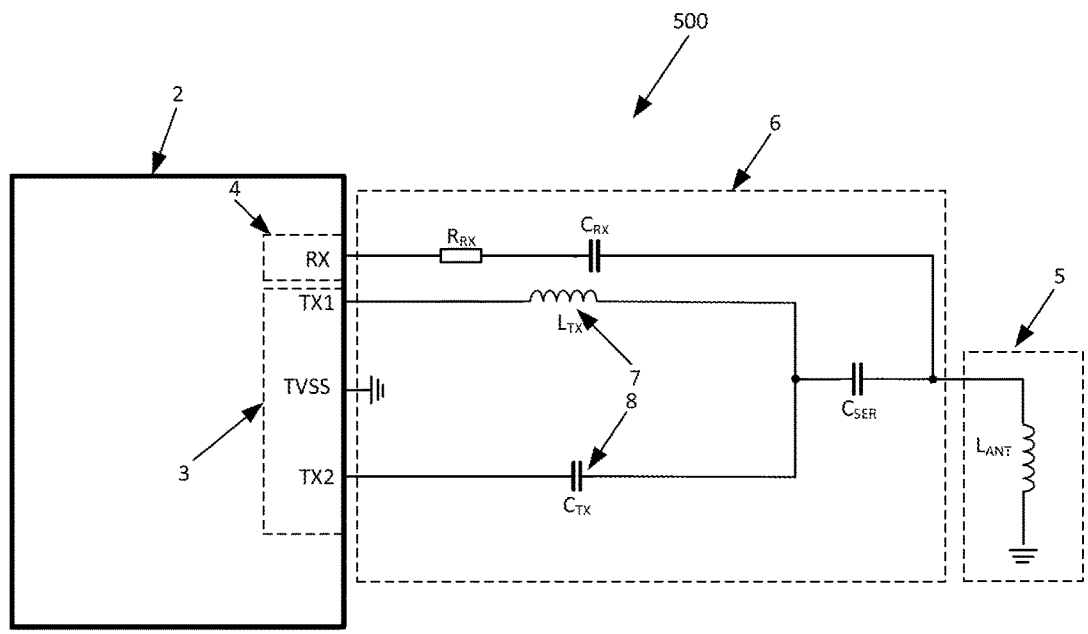
FIG. 5 is another embodiment of the NFC device.

FIG. 5 is another embodiment of the NFC device. This embodiment and the embodiment of FIG. 3 have much in common. The only difference lies in the replacement of the parallel capacitor $C_{PAR}$ in the transmitting paths by a series capacitor $C_{SER}$ as explained below.

As depicted in FIG. 5, the NFC device 500 includes an RF front end module 6 being coupled between the NFC module 2 and antenna circuit 5. The RF front end module 6 may include an inductor $L_{TX}$ 7 coupled to output terminal TX1 in the first transmitting path, and further includes a capacitor $C_{TX}$ 8 coupled to output terminal TX2 in the second transmitting path. In this embodiment, the parallel capacitor $C_{PAR}$ is replaced by a series capacitor $C_{SER}$. The series capacitor $C_{SER}$ is sufficient to build a series resonant circuit with $L_{TX}$, $C_{TX}$, and $L_{ANT}$. Furthermore, the series capacitor $C_{SER}$ removes DC in the transmitting paths.

As with the first embodiment, this embodiment allows the use of a differential transmitter (differential transmitter 3) without a Balun transformer and further reduces the number of components used in the RF front end module.

Figure 6:
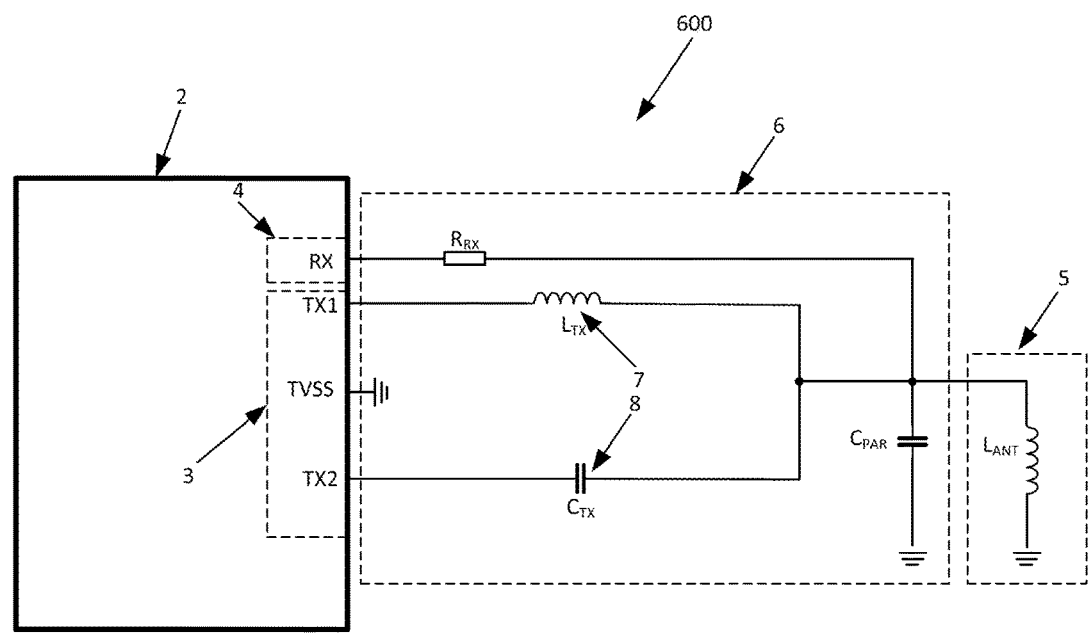
FIG. 6 is yet another embodiment of the NFC device.

FIG. 6 is yet another embodiment of the NFC device. This embodiment and the embodiment of FIG. 3 have much in common. The only difference lies in the elimination of the decoupling capacitor $C_{RX}$ in the receiving path.

As depicted in FIG. 6, the NFC device 600 includes an RF front end module 6 being coupled between the NFC module 2 and antenna circuit 5. The RF front end module 6 may include an inductor $L_{TX}$ 7 coupled to output terminal TX1 in the first transmitting path, and a capacitor $C_{TX}$ 8 coupled to output terminal TX2 in the second transmitting path. The RF front end module 6 may also include a parallel capacitor CPA in the transmitting paths, and a resistor $R_{RX}$ in the receiving path.

As with the first embodiment, this embodiment allows the use of a differential transmitter (differential transmitter 3) without a Balun transformer and further reduces the number of components used in the RF front end module. For instance, the decoupling capacitor $C_{RX}$ is removed from the receiving path, and may be integrated into the NFC IC, i.e., NFC module 2.

It should be noted that the above embodiments are applicable to an NFC module having a differential transmitter and a single ended receiver. It should also be noted that the above embodiments are applicable to a single ended antenna configuration.

The NFC device described in the above embodiments may be incorporated into a mobile device, e.g., a mobile phone, and adapted to be powered by the mobile device.

It should be noted that the above-mentioned embodiments illustrate rather than limit the invention, and that those skilled in the art will be able to design many alternative embodiments without departing from the scope of the appended claims. It is intended that the following claims cover all possible example embodiments.

In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A device for inductively coupled communications comprising:
    a near field communication (NFC) module being adapted to generate an electromagnetic carrier signal and to modulate the carrier signal according to data to be transmitted, said NFC module including a differential transmitter and a single ended receiver,
    a singled ended antenna coupled to said NFC module and driven by said NFC module with the modulated carrier signal; and
    an RF front end coupled between said NFC module and said antenna;
    said RF front end including a first inductor coupled to a first terminal of said differential transmitter in a first transmitting path, and a first capacitor coupled to a second terminal of said differential transmitter in a second transmitting path;
    said RF front end further including a receiving path and a second capacitor, said second capacitor arranged in parallel and connected between an input terminal of the antenna and ground;
    wherein said differential transmitter of said NFC module operates with said single ended antenna without using a balanced to unbalanced (Balun) transformer,
    wherein said first inductor, said first capacitor, and said second capacitor being adapted to provide a function of an electromagnetic compatibility (EMC) filter without a dedicated LC pair coupled to each of said first terminal of said differential transmitter and said second terminal of said differential transmitter.

2. The device of claim 1, further comprising a third capacitor connected in series with the first inductor in the first transmitting path.

3. The device of claim 1, wherein the receiving path comprises a resistor and a decoupling capacitor connected in series.

4. The device of claim 1, wherein the receiving path comprises a resistor.

5. The device of claim 1, wherein said device is incorporated in a mobile device and adapted to be powered by the mobile device.

6. A device for inductively coupled communications comprising:
    a near field communication (NFC) module being adapted to generate an electromagnetic carrier signal and to modulate the carrier signal according to data to be transmitted, said NFC module including a differential transmitter and a single ended receiver,
    a singled ended antenna coupled to said NFC module and driven by said NFC module with the modulated carrier signal; and
    an RF front end coupled between said NFC module and said antenna;
    said RF front end including a first inductor coupled to a first terminal of said differential transmitter in a first transmitting path, and a first capacitor coupled to a second terminal of said differential transmitter in a second transmitting path;
    said RF front end further including a receiving path and a second capacitor, said second capacitor arranged in series and connected between an interaction of the first and second transmitting paths and an input terminal of the antenna;
    wherein said differential transmitter of said NFC module operates with said single ended antenna without using a balanced to unbalanced (Balun) transformer,
    wherein said first inductor, said first capacitor, and said second capacitor being adapted to provide a function of an electromagnetic compatibility (EMC) filter without a dedicated LC pair coupled to each of said first terminal of said differential transmitter and said second terminal of said differential transmitter.

7. The device of claim 6, further comprising a third capacitor connected in series with the first inductor in the first transmitting path.

8. The device of claim 6, wherein the receiving path comprises a resistor and a decoupling capacitor connected in series.

9. The device of claim 6, wherein the receiving path comprises a resistor.

10. The device of claim 6, wherein said device is incorporated in a mobile device and adapted to be powered by the mobile device.

* * * * *